United States Patent [19]

Nishimatsu et al.

[11] Patent Number: 4,637,963

[45] Date of Patent: Jan. 20, 1987

[54] MAGNETIC RECORDING MEDIUM AND METHOD FOR MAKING

[75] Inventors: Masaharu Nishimatsu; Toshiaki Ide; Yoshiaki Saito; Yuichi Kubota, all of Tokyo, Japan

[73] Assignee: TDK Corporation, Tokyo, Japan

[21] Appl. No.: 673,029

[22] Filed: Nov. 19, 1984

[30] Foreign Application Priority Data

Nov. 17, 1983 [JP] Japan .................................. 58-216573

[51] Int. Cl.$^4$ .............................................. G11B 5/72
[52] U.S. Cl. ..................................... 428/694; 360/134; 360/135; 360/136; 427/44; 427/128; 427/131; 428/323; 428/328; 428/329; 428/900; 428/522; 428/523
[58] Field of Search ............... 428/694, 900, 695, 329, 428/328, 323, 408, 522, 523; 427/44, 128, 131; 360/134-136

[56] References Cited

U.S. PATENT DOCUMENTS

| | | | |
|---|---|---|---|
| 4,183,976 | 1/1980 | Yamada | 427/130 |
| 4,419,406 | 12/1983 | Isobe | 427/44 |
| 4,468,436 | 8/1984 | Okita | 428/425.9 |
| 4,511,629 | 4/1985 | Konno | 428/694 |
| 4,547,419 | 10/1985 | Nishimatsu | 427/128 |
| 4,559,265 | 12/1985 | Kubota | 427/128 |
| 4,560,617 | 12/1985 | Nishimatsu | 427/128 |

*Primary Examiner*—Ellis P. Robinson
*Attorney, Agent, or Firm*—Oblon, Fisher, Spivak, McClelland, & Maier

[57] ABSTRACT

In a magnetic recording medium comprising a non-magnetic substrate having opposed major surfaces, a non-magnetic undercoat on one major surface of the substrate, a magnetic layer on the undercoat, and a non-magnetic backcoat on the other major surface of the substrate, at least one of said undercoat and said backcoat is formed of a coating composition comprising a radiation curable base resin preferably having a radiation-sensitive double bond such as acrylic, maleic or allylic double bond, an optional thermoplastic resin, and an effective amount of an anti-static agent selected from known surface-active agents, the composition being cured through crosslinking by exposure to radiation. The magnetic recording medium is prepared by mixing the resins with the anti-static agent, coating the substrate with the composition, and exposing the coating to radiation.

10 Claims, No Drawings

MAGNETIC RECORDING MEDIUM AND METHOD FOR MAKING

BACKGROUND OF THE INVENTION

This invention relates to magnetic recording media, and more particularly, to magnetic recording media comprising a substrate, a non-magnetic undercoat on one surface of the substrate, a magnetic layer on the undercoat, and a backcoat on the other surface of the substrate.

The most common and simple form of magnetic recording medium is magnetic recording tape comprising a substrate or film and a magnetic layer formed thereon. It was a common practice in the prior art to prime a substrate such as a polyester film with a resin solution to form an undercoat on the substrate to improve the bond between the substrate and the magnetic layer formed thereon.

After a resin solution is applied to form the undercoat, a magnetic lacquer of magnetic particles and a binder in an organic solvent is applied thereon to form the magnetic layer. The undercoat is affected by the organic solvent of the magnetic lacquer such that the undercoat is swelled to penetrate through the overlying magnetic layer until exposed at the surface. If the resin of the undercoat is thermosetting, unreacted portions remaining after a heat treatment will cause the turns or layers to be undesirably adhered when the magnetic recording medium is wound into a roll or placed one on top of the other, eventually deteriorating the surface properties of the medium.

To obviate this problem, it was proposed to apply a resin containing a radiation-sensitive unsaturated double bond onto a substrate and expose the resin to radiation for crosslinking and polymerization before a magnetic layer is formed (see Japanese Patent Application Kokai No. 57-40747).

Electric charges accumulating during the application of an undercoating solution result in a non-uniform undercoat, for example, having streaks. It is thus necessary to allow such electric charges to escape away. Electric charges also prevent the film to be coated from smoothly travelling, also resulting in a non-uniform undercoat and disturbing the winding of the film into a compact roll. It is thus necessary to control such electric charges.

At present, magnetic tape is used in a variety of applications including audio, video, and computer applications. The quantity of information to be recorded in the medium is progressively increased and thus, the requirement of increased recording density is imposed on magnetic recording media.

In the existing recording mode using magnetic heads, the spacing loss between the tape and the head is represented by the formula: $54.6 d/\lambda$ dB where $d$ is a tape-to-head distance and $\lambda$ is a recording wavelength. This formula indicates that short wavelength recording promising a higher recording density undergoes a larger loss of output by spacing than long wavelength recording. Then, even small foreign particles on the tape surface are detectable as dropouts.

The factors believed to bring out dropouts include release of magnetic particles form the magnetic coating surface of the magnetic tape due to deterioration of the magnetic coating caused by the repeated application of stresses, electrostatic adhesion of pieces worn from the substrate and dust to the substrate surface, and transfer of such worn pieces and dust to the magnetic layer surface. A variety of methods have been proposed in order to eliminate these unfavorable factors. For example, it is proposed to apply a lacquer of carbon black or graphite in an organic binder onto that surface of the substrate remote from the magnetic layer, that is, the back surface to form a backcoat to render the substrate more tough for minimizing abrasion or wear of the substrate. Such treatments including backcoating are effective in reducing the tendency of dropout increasing with repeated travels, but not to a satisfactory extent. There is the need for further reducing dropout. How dropouts are induced in magnetic tape is described in Japanese Patent Application No. 56-54362 of the same assignee as the present application. The binders used are usually thermosetting resins. In an ordinary coating process, tape is coated with a backcoat and then wound into a roll before a heat treatment is effected for curing. This means that the backcoat is fragile at the end of coating process because the curing reaction is not initiated. Since the backcoat is in firm contact with the magnetic layer in the roll form, particles of the inorganic filler such as carbon black and graphite present on the surface of the backcoat tend to transfer to the opposed surface of the magnetic layer in contact therewith. The thus transferred particles cause dropouts and head gap jamming. It is believed that this phenomenon also applies to thermoplastic resins. The number of dropouts is not satisfactorily small at the initial stage or after several travels for the reason mentioned above although the provision of a backcoat is effective in retarding dropout from increasing with repeated travels.

In order to eliminate the above-mentioned inconvenience in the backcoat forming process, it is possible to form a backcoat by applying a lacquer composition of an inorganic filler such as carbon black and graphite and a binder in the form of a radiation-curable resin (resin capable of crosslinking and curing upon exposure to radiation) onto a substrate to form a backcoat, applying radiation from an active energy ray source to effect a curing treatment or carrying out a surface treatment on the as-coated substrate, and then a curing treatment, thereby inducing three dimensional crosslinking in the backcoat to achieve a tough backcoat, and thereafter winding the tape into a roll. This process reduces the dropout due to the transfer of filler particles as mentioned above. In this process, the crosslinking reaction proceeds to the end in the backcoat before the tape is wound into a roll. Even when the backcoat is brought in close contact with the magnetic layer by winding, the transfer of filler particles from the backcoat to the magnetic layer is prohibited.

A satisfactory anti-static effect is not obtained unless inorganic fillers such as carbon black and graphite are blended in resins in larger amounts. However, blending large amounts of inorganic fillers gives rise to a problem in the surface roughness of the backcoat, which in turn, results in a reduction in the output of the magnetic layer.

SUMMARY OF THE INVENTION

It is, therefore, an object of the present invention to provide an improved magnetic recording medium having an anti-static undercoat.

It is another object of the present invention to provide a magnetic recording medium having a tack-free backcoat.

It is a further object of the present invention to provide an improved magnetic recording medium having an anti-static undercoat and an anti-static, tack-free backcoat.

It is a still further object of the present invention to provide an improved method for making a magnetic recording medium by applying a coating composition containing an anti-static agent and an optional pigment to a substrate thereby forming an undercoat and/or a backcoat on the substrate without defects caused by electric charges.

Other objects and advantages of the present invention will become evident from the following description.

According to the present invention, there is provided a magnetic recording medium comprising a non-magnetic substrate having opposed major surfaces, a non-magnetic undercoat on one major surface of the substrate, a magnetic layer on on the undercoat, and a non-magnetic backcoat on the other major surface of the substrate, characterized in that at least one layer of said undercoat and said backcoat is formed of a coating composition comprising 100 parts by weight of a radiation curable base resin and about 0.1 to 50 parts by weight of an anti-static agent, the composition being cured through crosslinking by exposure to radiation.

The undercoat and backcoat may be made anti-static by adding an anti-static agent to the undercoating and backcoating compositions. The compositions may be cured upon exposure to radiation since the base resin is a radiation-curable resin. If the resulting backcoat is sticky because of some non-crosslinked portions remaining after radiation curing, a pigment is added to the backcoating composition to thereby render the backcoat tack-free. The use of the anti-static agent in the form of a surface-active agent and the anti-tacky agent in the form of a pigment instead of conventional particulate fillers such as carbon black and graphite has the advantage that the surface roughness of the resulting backcoat is negligible and the flexibility of the base resin of the backcoat is fully utilized. As a whole, the magnetic recording medium is improved in electromagnetic properties.

DETAILED DESCRIPTION OF THE INVENTION

The substrate used in the magnetic recording medium according to the present invention may be formed of any well known plastic materials including polyesters such as polyethylene terephthalate, polyethylene naphthalate and polyarylate, polyacetal, polyamide, polyimide, polyamideimide, and polysalfon.

Coating Compositions

The undercoat and backcoat may be formed from a similar coating composition comprising a radiation curable resin and an anti-static agent. The radiation-curable resins which can be used in the present invention are synthetic resins capable of generating free radicals to form a crosslinked structure upon exposure to radiation, that is, containing more than one unsaturated double bond in each molecular chain. Such resins may be obtained by modifying ordinary thermoplastic resins so as to be radiation curable.

Illustratively, resins may be modified into radiation curable form by introducing into the molecule radiation-sensitive groupings capable of commencing crosslinking and polymerization upon exposure to radiation, for example, acrylic double bonds of acrylic acid, methacrylic acid and esters thereof containing an unsaturated double bond capable of radical polymerization, allylic double bonds of diallyl phthalate and the like, and unsaturated double bonds of maleic acid and maleates. The unsaturated double bonds which can be used for modification are not limited thereto as long as they are capable of commencing crosslinking reaction upon exposure to radiation.

Some non-limiting examples of the thermoplastic resins which can be modified into radiation-curable form are given below.

(a) Vinyl chloride type copolymers

There are included vinyl chloride-viny; acetate-vinyl alcohol copolymers (including copolymers having maleic acid or carboxylic acid incorporated therein), vinyl chloride-vinyl alcohol copolymers (including copolymers having maleic acid or carboxylic acid incorporated therein), vinyl chloride-vinyl alcohol-vinyl propionate copolymers, vinyl chloride-vinyl acetate copolymers having OH terminal groups and alkyl pendant groups, for example, VROH, VYNC, VYEGX, VERR, VYES, VMCA, and VAGH (trade names, all manufacture by U.C.C. Corporation).

These copolymers may be modified into radiation-curable form by incorporating an acrylic, maleic or allylic double bond therein by the procedure described later.

(b) Saturated Polyester Resins

There are included saturated polyester resins prepared by esterification between saturated polybasic acids such as phthalic acid, isophthalic acid, terephthalic acid, succinic acid, adipic acid, sebacic acid, etc. and polyhydric alcohols such as ethylene glycol, diethylene glycol, glycerine, trimethylolpropane, 1,2-propyleneglycol, 1,3-butanediol, dipropylene glycol, 1,4-butanediol, 1,6-hexanediol, pentaerythritol, sorbitol, neopentyl glycol, 1,4-cyclohexane dimethanol, etc., and resins obtained by modifying these resins with sodium sulfite ($Na_2SO_3$) such as Vyron 53S (trade name, manufactured by Toyobo K.K.). These resins may be modified into radiation curable form by the procedure described later.

(c) Unsaturated Polyester Resins

There are included unsaturated polyester resins having radiation-sensitive unsaturated double bonds in the molecular chain, for example, those polyester resins prepared by esterification between polybasic acids and polyhydric alcohols, but rendered unsaturated by partially replacing the polybasic acids by maleic acid, including prepolymers and oligomers.

The polybasic acids and polyhydric alcohols from which the saturated polyester resins are prepared may be selected from those members mentioned in (b), and the acids used to incorporate radiation-sensitive unsaturated double bonds may be maleic acid and fumaric acid.

The radiation-curable unsaturated polyester resins may be prepared by adding a double bond-incorporating acid such as maleic acid and fumaric acid to a reaction mixture of at least one polybasic acid and at least one polyhydric alcohol, causing the reaction mixture to react by a conventional process, that is, through water- or alcohol-removing reaction in the presence of a catalyst in a nitrogen atmosphere at 180° to 200° C., then raising the temperature to 240° to 280° C., and effecting condensation reaction in a vacuum of 0.5 to 1 mmHg.

The amount of maleic acid and fumaric acid added ranges from 1 to 40 mol %, preferably from 10 to 30 mol % of the acid component in consideration of the degree of crosslinking during preparation and the radiation curing characteristics of the resulting resins.

(d) Polyvinyl Alcohol Resins

There are included polyvinyl alcohol, butyral resins, acetal resins, formal resins, and copolymers thereof. These resins may be modified into radiation curable form by acting on hydroxyl groups contained therein by the procedure described later.

(e) Epoxy Resins and Phenoxy Resins

There are included epoxy resins prepared from bisphenol-A and epichlorohydrin and methyl epichlorohydrin, for example, Epikote 152, 154, 828, 1001, 1004 and 1007 (Shell Chemicals), DEN 431, DER 732, DER 511 and DER 331 (Dow Chemical), Epichlon 400 and 800 (Dai-Nihon Ink K.K.), and highly polymerized ones of the foregoing expoxy resins, for example, phenoxy resins such as PKHA, PKHC and PKHH (U.C.C. Corporation), and copolymers of brominated bisphenol-A with epichlorohydrin such as Epichlon 145, 152, 153 and 1120 (Dai-Nihon Ink K.K.). These resins may be modified into radiation curable form by making use of epoxy groups contained therein.

(f) Cellulose Derivatives

A variety of cellulose derivatives are useful as the thermoplastic component. Particularly preferred are pyroxylin, cellulose acetobutyrate, ethyl cellulose, butyl cellulose, acetyl cellulose, and the like. These derivatives may be modified into radiation curable form by the procedure described later as by activating hydroxyl groups in the resins.

Other examples of the resins which can be modified into radiation curable form include polyfunctional polyester resins, polyether-ester resins, polyvinyl pyrrolidone resins and derivatives thereof such as PVP-olefin copolymers, polyamide resins, polyimide resins, phenol resins, spiroacetal resins, acrylic resins containing at least one of acrylates and methacrylates having a hydroxyl group as a polymer component, and the like.

More tough coatings may be obtained by blending the above-mentioned radiation-curable thermoplastic resins with unmodified thermoplastic elastomers or prepolymers. Further advantages are achieved if these elastomers or prepolymers are also modified into radiation curable form. Examples of the thermoplastic elastomers and prepolymers which can be used in combination with the above-mentioned radiation curable resins are shown below.

(g) Polyurethane Elastomers, Prepolymers and Telomers

Polyurethane elastomers are particularly useful because of wear resistance and adhesion to PET films. Examples of the urethane compounds include polyurethane elastomers, prepolymers and telomers of polycondensation products between (i) isocyanates such as toluene-2,4-diisocyanate, toluene-2,6-diisocyanate, xylene-1,3-diisocyanate, xylene-1,4-diisocyanate, naphthalene-1,5-diisocyanate, m-phenylenediisocyanate, p-phenylenediisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene-1,6-diisocyanate, isophoronediisocyanate, dicyclohexylmethane diisocyanate, and polyfunctional isocyanates such as Desmodur L and Desmodur N (trade name, Bayer A.G.) and (ii) various polyesters such as linear saturated polyesters prepared through polycondensation of polyhydric alcohols such as ethylene glycol, diethylene glycol, glycerine, trimethylol propane, 1,4-butanediol, 1,6-hexanediol, pentaerythrytol, sorbitol, neopentylglycol, 1,4-cyclohexanedimethanol, etc. with saturated polybasic acids such as phthalic acid, isophthalic acid, terephthalic acid, succinic acid, adipic acid, sebacic acid, etc.; linear saturated polyethers such as polyethylene glycol, polypropylene glycol, and polytetramethylene glycol; caprolactam; hydroxyl-containing acrylates and hydroxyl-containing methacrylates, and the like. These elastomers, prepolymers and telomers may be combined with the radiation-curable modified thermoplastic resins. Further advantages are obtained by reacting the urethane elastomers with monomers having acrylic or allylic double bonds capable of reacting with terminal isocyanate or hydroxyl groups of the elastomers, thereby modifying the elastomers into radiation curable form.

(h) Acrylonitrile-Butadiene Copolymerized Elastomers

There are included acrylonitrile-butadiene copolymer prepolymers having terminal hydroxyl groups such as Poly BD Liquid Resin (trade name, Sinclair Petrochemical Company) and such elastomers as Hycar 1432J (trade name, Nihon Zeon K.K.) are useful as elastomers capable of crosslinking and polymerization because double bonds in the butadiene moiety generate radicals upon exposure to radiation.

(i) Polybutadiene Elastomers

Low molecular weight butadiene prepolymers having terminal hydroxyl groups such as Poly BD Liquid Resin R-15 (trade neme, Sinclair Petrochemical Company) are useful particularly because they are compatible with thermoplastic resins. Since R-15 prepolymer has a hydroxyl group at either end of its molecule, it can be rendered more radiation sensitive by adding an acrylic unsaturated double bond to the molecule end. It is then more advantageous as the binder.

Cyclized polybutadienes such as CBR M 901 (trade name, Nihon Synthetic Rubber K.K.) also exhibit improved performance when combined with thermoplastic resins. They are very useful as the binder because unsaturated bonds inherently contained in the polybutadiene create radicals upon exposure to radiation to promote crosslinking and polymerization.

Other examples of the preferred thermoplastic elastomers and prepolymers include styrene-butadiene rubbers, chlorinated rubbers, acrylic rubbers, isoprene rubbers, and cyclized products thereof such as CIR 701 (trade name, Nihon Synthetic Rubber K.K.), epoxy-modified rubbers, internally plasticized saturated linear polyesters such as Vyron #300 (trade name, Toyobo K.K.), and the like. They may be effectively utilized by modifying them into radiation curable form.

In general, some high molecular compounds degrade and some undergo crosslinking between molecules upon exposure to radiation. Examples of the latter include polyethylene, polypropylene, polystyrene, polyacrylate, polyacrylamide, polyvinyl chloride, polyester, polyvinyl pyrrolidone rubber, polyvinyl alcohol, polyacrolein, etc. These crosslinkable polymers may be used as the base resin of the radiation-curable coating composition of the present invention without a particular modification treatment because crosslinking reaction takes place as such.

Also included are monomers of acrylic acid, methacrylic acid, acrylamide, methacrylamide, etc. The double bond containing binders may be obtained by modifying various olyesters, polyols, urethanes and other polymers with compounds having acrylic double bonds. If desired, the molecular weight of them may be controlled by further blending polyhydric alcohols or polyfunctional carboxylic acids. The foregoing examples are illustrative of the radiation curable resins used herein, but should not be construed to be limiting. Of course, mixtures of two or more of the foregoing resins may also be used in the practice of the present invention.

When the resins are of solventless type or do not require a solvent during application, they may be equally be used to form the undercoat and backcoat because they are curable within a short period of time.

The antistatic agents which can be used in the coating compositions according to the present invention may be those compounds generally known as surface-active agents. Examples of the surface-active agents which can be used as the antistatic agents include:

(i) anionic surface-active agents such as carboxylic salts such as fatty acid soaps, ether carboxylic acids and salts thereof, condensation products of (higher) fatty acids with amino acids, etc.; sulfuric acid derivatives such as (higher) alcohol sulfate ester salts, alkyl and alkyl allyl ether sulfate ester salts, sulfate ester salts of (higher) fatty acid esters, sulfate ester salts of (higher) fatty acid alkylol amides, etc.; phosphoric acid derivatives such as alkyl phosphate salts, alkyl phosphate salts derived from (higher) alcohols, phosphoric amide salts, alkyl phosphate esters derived from (higher) alcohols, etc. and natural surface active agents such as lecithin, cephalin, etc., pentaalkyl polyphosphates; hexaalkyl tetrapolyphosphates; dialkyl phosphonic acids; sulfonic acid derivatives such as (higher) alkyl sulfonate salts, alpha-olefin sulfonate salts, sulfonate salts of (higher) fatty acid esters, dialkyl sulfosuccinates, alkylbenzenesulfonates, etc., (ii) cationic surface-active agents such as amines such as alkyl amines, polyamines, amino alcohol fatty acid derivatives, etc.; quaternary ammonium salts such as alkyl quaternary ammoniums, alkyl trimethyl ammoniums, alkylazide quaternary ammoniums, dialkyl dimethyl ammoniums, alkyl dimethyl benzyl ammoniums, cyclic quaternary ammonium salts, quaternary ammonium salts having ether linkage, etc.; imidazolines such as imidazoline, polyoxyethylene-added phosphate salts, etc.; amine-ethylene oxide adducts such as polyoxyethylene alkyl amines, alkylamine oxides, etc.; quaternary phytic acid, etc., (iii) nonionic surface-active agents such as polyhydric alcohols such as alkyl ethers, polyethylene glycol, etc.; polyhydric alcohol esters such as polyoxysorbitan fatty acid esters, polyoxyethylene glycerine fatty acid esters, polyoxyethylene propylene glycol mono-fatty acid esters, etc.; alkyl phenol-ethylene oxide adducts such as polyoxyethylene alkyl phenyl ethers, ethylene oxide derivatives of alkylphenol formalin condensates, etc.; fatty acid-ethylene oxide adducts such as polyoxyethylene fatty acid esters, (higher) fatty acid glycerine esters, sorbitan fatty acid esters, sucrose fatty acid esters, pentaerythritol fatty acid esters, etc ; amide-ethylene oxide adducts such as polyoxyethylene fatty acid amides, etc.; amine-ethylene oxide adducts such as triethanolamine fatty acid partial esters, etc.; amides such as alkylol amides, etc., and (iv) amphoteric surface-active agents such as carboxylic acids such as amino acid type and betain type carboxylic acids; sulfonic acid; metal salts such as amide metal salts; alkyl betains such as alkyl betains, alkylamide betains, imidazolium betain, etc.

The surface-active agents are blended with the base resin in amounts of from 0.1 part to 50 parts by weight, preferably from 1 part to 50 parts by weight per 100 parts of the base resin. Satisfactory antistatic effect is not achieved with amounts of less than 0.1 part while the addition of the surface-active agents in amounts of more than 50 parts will result in the bleeding or exudation of the surface-active agents on the surface.

Also included are modified surface-active agents, for example, those modified by adding an acrylic double bond at the terminal, such as

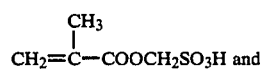

$CH_2=C-COOCH_2SO_3H$ and

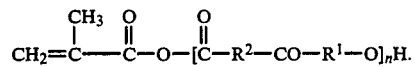

$CH_2=C-C-O-[C-R^2-CO-R^1-O]_nH.$

It is to be noted that lubricants having an acrylic double bond added thereto, for example, $CH_2=CHCOOR$ and $CH_2=CHCONHCH_2OCOR$ where R stands for $C_mH_{2m+1}-$, $C_mH_{2m}-$ or $C_mH_{2m-1}-$ may be used to improve the dispersion of additives in the base resin and the lubricity of the resulting coatings. When such a double bond-added surface-active agent is used, the acrylic double bonds contained therein generate radicals upon exposure to radiation which react with radicals generated in the base resin or binder so that the surface active agent is strongly bonded with the base resin, resulting in further improved surface and electromagnetic properties.

In order to prevent the surface active agent from exudating or bleeding out of the backcoat layer and migrating to the magnetic layer during storage at elevated temperatures, pigments are preferably be added to the coating compositions. Examples of the pigments include silicon oxide ($SiO_2$), titanium oxide ($TiO_2$) such as titanium white, aluminum oxide ($Al_2O_3$), chromium oxide ($Cr_2O_3$), silicon carbide (SiC), cerium oxide ($CeO_2$), calcium carbonate ($CaCO_3$), zinc oxide, iron oxyhydroxide, alpha-iron trioxide ($\alpha$-$Fe_2O_3$), talc, kaolin, calcium sulfate ($CaSO_4$), boron nitride, powder fluorocarbon resin such as Teflon powder, graphite, molybdenum disulfide, zirconia, calcium silicate, asbestos, white carbon, Chrome Yellow, Oil Yellow, Oil Blue, Oil Red, etc.

The pigment is added to the coating composition in amounts of 0.1 to 100 parts, and preferably 1 to 50 parts per 100 parts by weight of the base resin. Amounts of more than 100 parts will result in brittle coatings.

The surface-active agents and the pigments may be used alone or in admixture of two or more.

The coating compositions from which the backcoat is formed may further contain a lubricant as the case may be. Double bond-added lubricants are particularly preferred as mentioned above.

The active energy radiation which can be used to initiate the crosslinking of the coating composition may include electron rays emitted by means of radiation accelerators, gamma-rays emitted using $Co^{60}$ as a source, beta-rays emitted using $Sr^{90}$ as a source, X-rays emitted by means of X-ray generators, and ultraviolet radiation.

Radiation emitted by means of a radiation accelerator may preferably be used from points of view of control of the dose of radiation absorbed, matching with a manufacture line, shield of electromagnetic waves, and the like.

The preferred way of applying radiation for curing of the coating compositions applied as the undercoat and/or backcoat is to emit radiation by means of a radiation accelerator having an accelerating voltage of 100 to 750 kilovolts, and preferably 150 to 300 kilovolts so as to provide a dose of radiation absorbed of 0.5 to 20 megarad In curing the coating compositions applied as the undercoat and/or backcoat, a radiation accelerator of low dose type manufactured by Energy Science Company (U.S.) and known as an electrocurtain system, an accelerator manufactured by RP Company, and similar accelerators are particularly advantageously used because they are easy to incorporate in the existing tape coating line and to shield secondary X-rays in the interior thereof. Of course, Van de Graaff accelerators which have been widely used as radiation accelerators may also be used.

In carrying out radiation crosslinking, it is important in most cases to expose the coating compositions to radiation in a stream of an inert gas such as nitrogen gas and helium gas. Exposure to radiation in air will generate ozone ($O_3$) and other active substances which adversely affect crosslinking reaction, that is, prevent radicals generated in the base resin or binder from efficiently undergoing crosslinking reaction. The atmosphere where active energy beams are applied should preferably be an atmosphere of an inert gas such as nitrogen ($N_2$), helium (He) and carbon dioxide ($CO_2$) containing less than about 1% by volume of oxygen.

When ultraviolet radiation is applied to the radiation curable coating compositions for curing, the coating compositions may preferably further contain 0.1 to 10% by weight of a photo sensitizer. The coating compositions may be exposed to ultraviolet radiation in air because the atmosphere is less affected by ultraviolet radiation than by electron beams. Examples of the photo sensitizers include benzoins such as benzoin, benzoin methyl ether, benzoin ethyl ether, benzoin isopropyl ether, alpha-methyl benzoin, alpha-phenyl benzoin, etc.; anthraquinones such as anthraquinone, methyl anthraquinone, etc.; anthracene; alpha-chloromethylnaphthalene; phenylketones such as benzyl diacetyl, acetophenone, benzophenon, etc.; sulfides such as diphenyl disulfide, tetramethylthiuram sulfide, etc.; and halogenated hydrocarbons such as hexachlorobutadiene, pentachlorobutadiene, etc.

The magnetic recording media in which the undercoat and/or backcoat of the above-mentioned coating composition is provided include audio tape, video tape, computer tape, floppy discs, endless tape, and the like. The present invention is particularly, useful for video tape, computer tape and floppy discs because dropout is one of the most important characteristics required for these articles of manufacutre.

Magnetic Layer

One form of magnetic layer which can be provided in the magnetic recording medium according to the present invention is a magnetic layer of coating type which is formed by coating a lacquer or dispersion of magnetic particles followed by drying. The magnetic particles may be gamma-iron trioxide ($\gamma$-$Fe_2O_3$), iron tetraoxide ($Fe_3O_4$), cobalt-doped $\gamma$-$Fe_2O_3$, cobalt-doped $\gamma$-$Fe_2O_3$-$Fe_3O_4$ solid solution, chromium dioxide ($CrO_2$), cobalt compound-carrying $\gamma$-$Fe_2O_3$ and cobalt compound-carrying $Fe_3O_4$ (including intermediate oxide forms between cobalt compound and $\gamma$-$Fe_2O_3$); the term cobalt compound designates those cobalt compounds capable of utilizing the magnetic anisotropy of cobalt for improving coercive force, for example, cobalt oxide, cobalt hydroxide, cobalt ferrite, cobalt ion adsorbed materials and the like.), and ferromagnetic metals such as iron and cobalt alone and their combinations such as Fe-Co, Fe-Co-Ni, Co-Ni, etc., but not limited thereto. These magnetic layers may be formed by any desired one of conventional processes including a wet reduction process using a reducing agent such as $NaBH_4$, a dry reduction process of treating the surface of iron oxide with a silicon compound followed by reduction with hydrogen gas, and a vacuum deposition process of evaporating the magnetic particles in vacuum, that is, in an argon gas stream under a reduced pressure. Pulverlized monocrystalline barium ferrite may also be used. Alternatively, a ferromagnetic thin film may be formed by electroplating, chemical plating, vacuum deposition or evaporation, sputtering, ion plating and the like.

Finely divided magnetic materials may be used in needle or round form depending on the particular magnetic recording medium to whcih they are applied.

The binders used to bind the magnetic particles may be selected from the thermoplastic, thermosetting and radiation curable resins which are all previously listed for the coating compositions although resins other than the above-mentioned may also be used. The resin used in the magnetic layer may be identical with or different from the resins used in the coating compositions.

It is very advantageous in view of a manufacturing process that both the undercoat and backcoat are formed from the same coating composition comprising a radiation curable resin and an anti-static agent in the form of a surface-active agent because the application of both the coats to the substrate can be simultaneously carried out as by dipping.

DESCRIPTION OF THE PREFERRED EMBODIMENT

Examples are given below by way of illustration and not by way of limitation. All parts are by weight. MEK is methyl ethyl ketone.

EXAMPLE 1

Four types of magnetic recording tapes were prepared (i) tape having a magnetic layer directly formed thereon, (ii) tape having a magnetic layer directly formed thereon and a backcoat, (iii) tape having an undercoat and a magnetic layer formed on the undercoat, and (iv) tape having a backcoat, an undercoat, and a magnetic layer formed on the undercoat. All samples used a polyester film of 15 μm thick and had an undercoat of 0.1 μm thick and a backcoat of 1 μm thick in dry state.

The undercoat was formed from the following coating composition:

| Ingredients | Parts by weight |
| --- | --- |
| Vinyl chloride-vinyl acetate copolymer having an acrylic double bond incorporated | 30 |
| Polyether urethane elastomer having an acrylic double bond incorporated | 70 |
| Solvent (50/50 MEK/toluene) | 1000 |
| Phosphate ester of alkyl ether | 5 |

A uniform dispersion was prepared by dispersing the ingredients for 2 hours by means of a high speed mixer and then coated on that surface of a polyester film on which the magnetic layer was to be formed such that the resulting undercoat had a dry thickness of 0.1 μm. Using an electron beam accelerator under conditions: accelerating voltage 150 kV, electrode current 10 mA, dose of radiation absorbed 5 Mrad, and nitrogen gas atmosphere, electron beams were applied to the undercoating composition for curing. It was found that no discharge noise occurred during the process and the coating was fully uniform.

The above procedure was repeated except that the antistatic agent was excluded from the coating composition. Considerable discharge noise occurred during the process and resulted in irregularities in the undercoat to such an extent that the resulting product was commercially unacceptable at the later stage of a jumbo roll.

The backcoat was formed from the following coating composition:

| Ingredients | Parts by weight |
|---|---|
| Vinyl chloride-vinyl acetate copolymer having an acrylic double bond incorporated | 60 |
| Acryl-modified polyurethane elastomer | 40 |
| Solvent mixture (50/50 MEK/toluene) | 600 |
| Quaternary ammonium salt of alkylamide | 7 |

A uniform dispersion was prepared by dispersing the ingredients for 2 hours by means of a high speed mixer and then coated on the back surface of a polyester film such that the resulting backcoat had a dry thickness of 1 μm. The back coating composition was cured upon exposure to electron beams to a dose of 5 Mrad and the film was wound into a roll.

Thereafter, a magnetic layer was formed on the polyester film with or without the undercoat. The thus obtained films were severed into video tapes of ½″ wide and the tape samples were measured for sensitivity at 4 MHz by operating a commercial VHS video tape recorder.

The magnetic layer was formed by applying a magnetic lacquer which was first prepared from the following composition:

| Ingredients | Parts by weight |
|---|---|
| Cobalt-carrying needle-like γ-$Fe_2O_3$ (major axis 0.4 μm, minor axis 0.05 μm Hc 600 Oe) | 120 |
| α-$Al_2O_3$ powder (particulate, size 0.5 μm) | 2 |
| Dispersant (lecithin from soybean oil) | 3 |
| Solvent (50/50 methyl ethyl ketone/toluene) | 100 |

The ingredients were mixed for 3 hours in a ball mill to thoroughly wet the magnetic needle-like iron trioxide with the dispersant.

Separately, the following ingredients were thoroughly mixed into a solution.

| Ingredients | Parts by weight |
|---|---|
| Vinyl chloride-vinyl acetate copolymer* | 15 |
| Thermoplastic polyurethane** | 15 |
| Solvent (50/50 MEK/toluene) | 200 |
| Lubricant (higher fatty acid modified silicone oil) | 3 |

*VAGH manufactured by U.C.C. Corporation
**Nippolan 3022 manufactured by Nihon Polyurethane K.K., calculated as solids The solution was added to the ball mill containing the magnetic particle mixture and mixed for further 48 hours for dispersion.

At the end of dispersion, 5 parts by weight (solids) of an isocyanate (Desmodur L, manufactured by Bayer A.G.) capable of reacting with functional groups, mainly hydroxyl groups of the binder resins in the lacquer to form crosslinks was added to the charge in the ball mill and mixed therewith for 20 minutes.

The thus obtained magnetic lacquer was applied onto the polyester film, oriented under the influence of a permanent magnet (1600 Gauss), dried under an infrared radiation lamp or hot air blow to remove the solvent, subjected to a surface smoothing treatment, and thereafter placed in an over at 80° C. for 48 hours to promote the crosslinking reaction by the isocyanate.

The above-described process allows for the on-line processing of the magnetic tape by continuously radiation curing the undercoat, backcoat, and magnetic layer. The order of curing the undercoat and the backcoat is not limited. Either of them may be cured before the other is cured or they may be cured at the same time.

The following results were found as shown in Table 1. The magnetic layer is firmly adhered to the substrate via the intervening undercoat and the backcoat has improved surface properties because anti-static control is satisfactory during coating and winding or overlying. In addition to improved surface properties on the face and back sides, an improvement in electromagnetic properties is also achieved.

This example illustrates the on-line process of continuously curing the undercoat and the backcoat with radiation and curing the magnetic layer with heat, which is advantageous in continuous process as compared with the prior art tape having thermosetting undercoat and backcoat

EXAMPLE 2

The undercoat and backcoat formed in this example had the following compositions.

| Ingredient | Parts by weight |
|---|---|
| Undercoat | |
| Epoxy resin | 30 |
| Polybutadiene elastomer having an acrylic double bond incorporated | 70 |
| Solvent (50/50 MEK/cyclohexane) | 2000 |
| Tertiary amine salt | 20 |
| Backcoat | |
| Acryl-modified polyester resin | 60 |
| Acryl-modified polybutadiene elastomer | 40 |
| Solvent mixture | 600 |
| Phosphate ester derived from alcohol | 20 |

The magnetic layer was formed by applying a magnetic lacquer which was first prepared from the following composition:

| Ingredients | Parts by weight |
|---|---|
| Fe—Co—Ni alloy needle-like magnetic powder (major axis 0.3 μm, minor axis 0.04 μm Hc 600 Oe) | 120 |
| Dispersant (oleic acid) | 2 |
| Solvent (50/50 MEK/toluene) | 100 |

The ingredients were mixed for 3 hours in a high speed mixer to thoroughly wet the magnetic needle-like alloy powder with the dispersant.

Separately, the following ingredients were thoroughly mixed into a solution.

| Ingredients | Parts by weight |
|---|---|
| Butyral resin having an acrylic double bond incorporated | 18* |
| Urethane elastomer having an acrylic double bond incorporated | 12* |
| Solvent (50/50 MEK/toluene) | 200 |
| Lubricant (higher fatty acid) | 3 |

*calculated as solids

The solution was added to the high speed mixer containing the magnetic particle mixture and mixed for further 1 hour and then mixed for further 4 hours in a sand mill for thorough dispersion.

The thus obtained magnetic lacquer was applied onto the polyester film, magnetically oriented, dried to remove the solvent, and subjected to a surface smoothing treatment as described in Example 1. Thereafter, the layer was exposed to electron beams using an electron curtain type electron accelerator under conditions: accelerating voltage 150 kV, electrode current 10 mA, irradiation dose 5 Mrad and nitrogen gas atmosphere, thereby curing the layer.

EXAMPLE 3

The procedure of Example 2 was repeated except that the following undercoating composition was used.

| Ingredients | Parts by weight |
|---|---|
| Acryl-modified polyester resin | 20 |
| Polyetherurethan elastomer having acrylic double bond incorporated | 80 |
| Solvent (50/50 MEK/cyclohexane) | 2000 |
| Mono-/di-aminoalkyl methacrylate | 30 |

The tape samples prepared in Examples 1 to 3 were measured for dropout, sensitivity, and adhesion.

Dropout

A commercial VHS video recorder was loaded with a sample tape at a temperature of 20° C. and a relative humidity of 60%. A monotone signal at 4 MHz was recorded and reproduced. The number of outputs reduced lower than the average reproduction level by at least 18 dB and continuing for at least 15 μsec. was counted per minute. The result is an average of ten (10) samples.

Sensitivity

The level of the reproduced signal was measured at 4 MHz. The control sample without the undercoat and backcoat was regarded the standard, i.e., 0 dB and the difference of a measurement from the standard was determined.

Adhesion

The adhesion between the magnetic layer and the substrate was measured by means of a Tensilon meter (Toyo Sokki K.K.) at 20° C. and RH 60%.

The results are shown in Table 1.

TABLE 1

| | Sensitivity (at 4 MHz) | Adhesion (gram) | Dropout (/min.) |
|---|---|---|---|
| Example 1 | | | |
| Backcoat + Undercoat | +1.0-+0.4 | 120 | 15 |
| Backcoat | +0.5-+0.2 | — | 50 |
| Undercoat | +0.5-+0.2 | 120 | 100 |
| No coat | 0 | 20 | 300 |
| Example 2 | | | |
| Backcoat + Undercoat | +1.0 | 110 | 20 |
| Backcoat | +0.5 | — | 60 |
| Undercoat | +0.5 | 110 | 150 |
| No coat | 0 | 25 | 300 |
| Example 3 | | | |
| Backcoat + Undercoat | +1.0 | 150 | 5 |
| Backcoat | +0.5 | — | 30 |
| Undercoat | +0.5 | 150 | 100 |
| No coat | 0 | 25 | 300 |

Table 1 shows that the sensitivity is increased by 1.0 to 0.2 dB by forming the undercoat and/or backcoat according to the present invention while taking advantage of the flexibility of the base resin. The provision of the anti-static undercoat greatly increases the adhesion and also reduces the dropout to some extent. The provision of the anti-static backcoat greatly reduces the dropout.

When the magnetic layer is formed of a thermosetting resin base composition as in Example 2, heat for setting is also applied to a jumbo roll to tighten the film roll so that electromagnetic properties become different between the outside and the inside of the roll. For example, a difference of 0.6 dB results from such a tightened roll having a sensitivity increase of +1.0 dB at the outside and +0.4 dB at the inside.

With respect to dropout the result of Example 3 was better than that of Example 1 because the roll prepared in Example 3 did not undergo tightening during thermosetting. In Example 2 wherein a thermoplastic resin was used as the undercoat, no substantial difference in electromagnetic properties between the outside and the inside of a roll was observed because it was free of tightening during thermosetting. However, because of the inclusion of the thermosetting resin, the undercoat could be swelled with the solvent of the magnetic lacquer to yield a slightly deteriorated surface, resulting in lower electromagnetic properties (sensitivity) than in Example 3.

The samples prepared in Example 3 were stored for a period of time at elevated temperatures and high humidity No problem was observed within one or two days, but undesirably the surface-active agent bled out of the backcoat to render it tacky after storage for three or more days. It was found that the addition of a pigment was effective in blocking control, that is, in preventing the backcoat from becoming tacky while minimizing output reduction. This effect is illustrated by the following example.

EXAMPLE 4

The procedure of Example 3 was repeated except that 20 parts by weight of silicon dioxide (SiO$_2$) was added to the backcoating composition. The results are shown in Table 2.

TABLE 2

| | Sensitivity | Tackiness after 5 days |
|---|---|---|
| Example 3 | +1.0 dB | 2 |
| Example 4 | +0.8 dB | 5 |

Tackiness was visually evaluated after a sample tape was wound on a VHS reel and allowed to stand for 5 days at a temperature of 40° C. and a relative humidity of 60%. The tackiness was classified into five ratings, 1 to 5, with rating 5 being the best.

It was also found that the electromagnetic properties were deteriorated with an increasing amount of the pigment added. The addition of the pigment in amounts in excess of 100 parts resulted in brittle backcoats with deteriorated electromagnetic properties. Within the range from 1 to 100 parts and more preferably from 5 to 50 parts, the pigment well functioned as demonstrated by an increase of sensitivity of +0.4 dB or more.

Example 5

The procedure of Example 4 was repeated except that the backcoating composition further contained 0.3 parts of benzoin ethyl ether as a photo sensitizer. The composition was exposed to ultraviolet radiation at a line speed of 30 m/min. under a high pressure mercury lamp (output 240 W, effective lamp length 1 m). The results are shown in Table 3.

TABLE 3

| | Sensitivity | Tackiness after 5 days |
|---|---|---|
| Example 5 | +1.0 dB | 4 |

In the above-described examples, either the undercoat or the backcoat or both the undercoat and the backcoat are formed from the coating compositions of the present invention. Magnetic tapes having an undercoat of the present coating composition and a backcoat of a conventional coating composition are also included within the scope of the present invention as well as those having an undercoat of a conventional coating composition and a backcoat of the present coating composition.

Although the present invention is described in conjunction with the particular embodiments, the invention is not limited thereto and various modifications and variations may be made within the and spirit of the invention.

What is claimed is:

1. A magnetic recording medium comprising a non-magnetic substrate having opposed major surfaces, a non-magnetic undercoat on one major surface of the substrate, and a magnetic layer on the undercoat, characterized in that said undercoat is formed of an undercoating composition comprising 100 parts by weight of a radiation curable base resin and about 0.1 to 50 parts by weight of an anti-static agent, the composition being cured through crosslinking by exposure to radiation, the magnetic recording medium further comprising a non-magnetic backcoat on the other major surface of the substrate, wherein said backcoat is formed of a backcoating composition comprising 100 parts by weight of a radiation curable base resin and about 0.1 to 50 parts by weight of an anti-static agent and 0.1 to 100 parts by weight of a pigment, the composition being cured through crosslinking by exposure to radiation.

2. The magnetic recording medium according to claim 1 wherein the undercoating composition further comprises a thermoplastic resin free of a radiation-sensitive double bond.

3. The magnetic recording medium according to claim 1 wherein the backcoating composition further comprises a thermoplastic resin free of a radiation-sensitive double bond.

4. The magnetic recording medium according to claim 1 wherein said radiation curable base resin is selected from radiation curable resins having a radiation-sensitive unsaturated double bond selected from acrylic, maleic, and allylic double bonds, and mixtures of said radiation curable resins with prepolymers, oligomers and telomers thereof.

5. The magnetic recording medium according to claim 1 wherein said anti-static agent is selected from carboxylic acids, carboxylates, sulfate derivatives, phosphate derivatives, amines, amides, quaternary ammonium salts, imidazolines, polyhydric alcohols, alkyl betains, alkyl ethers, anhydrous phosphates, and mixtures thereof.

6. The magnetic recording medium according to claim 1 wherein said pigment is selected from silicon dioxide, titanium dioxide, aluminum oxide, chromium oxide, cerium oxide, zinc oxide, silicon carbide, calcium carbonate, calcium sulfate, calcium silicate, iron oxyhydroxide, alpha-iron trioxide, talc, kaolin, boron nitride, powder fluorocarbon resin, graphite, molybdenum disulfide, zirconia, asbestos, white carbon, chrome yellow, Oil Yellow, Oil Blue, Oil Red, and mixtures thereof.

7. The magnetic recording medium according to claim 1 wherein said magnetic layer comprises a member selected from gamma-iron trioxide, cobalt-doped gamma-iron trioxide, and ferromagnetic metals alone and mixtures thereof, and a resinous binder.

8. The magnetic recording medium according to claim 7 wherein said binder is a radiation curable resin.

9. A method for making a magnetic recording medium comprising a non-magnetic substrate having opposed major surfaces, a non-magnetic undercoat on one major surface of the substrate, a magnetic layer on the undercoat, and a non-magnetic backcoat on the other major surface of the substrate, said method comprising the steps of mixing 100 parts by weight of a radiation curable base resin with about 0.1 to 50 parts by weight of an anti-static agent to form an undercoating composition, applying the composition on the first major surface of the substrate, and exposing the composition to radiation for crosslinking, thereby forming the undercoating and, mixing 100 parts by weight of a radiation curable base resin with about 0.1 to 50 parts by weight of an anti-static agent and 0.1 to 100 parts by weight of a pigment to form a backcoating composition, applying the composition on the other major surface of the substrate, and exposing the composition to radiation for crosslinking, thereby forming the backcoat.

10. The method according to claim 9 wherein the undercoating and backcoating compositions are exposed to radiation at the same time.

* * * * *